April 24, 1934.   D. H. BOGGS ET AL   1,956,165
APPARATUS FOR INSPECTING GLASS
Filed Dec. 22, 1932

Inventors
David H. Boggs
and
Wm. J. Hefner

By
Bradley & Bee
Attorneys

Patented Apr. 24, 1934

1,956,165

UNITED STATES PATENT OFFICE 1,956,165

APPARATUS FOR INSPECTING GLASS

David H. Boggs, Tarentum, and William J. Hefner, Brackenridge, Pa., assignors to Pittsburgh Plate Glass Company, a corporation of Pennsylvania Application December 22, 1932, Serial No. 648,467

2 Claims. (Cl. 88—14)

Figure 1:
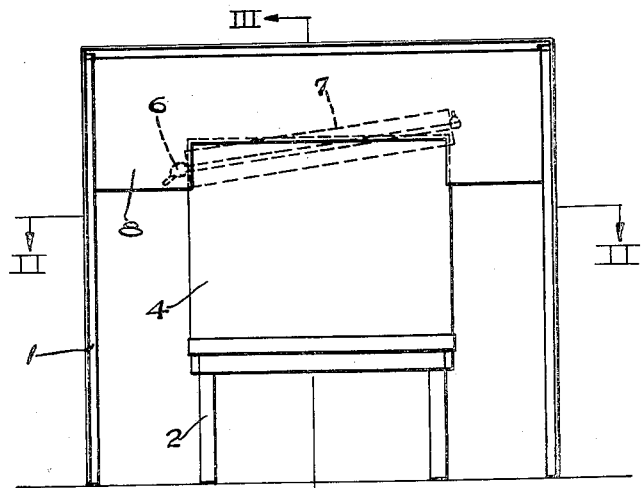
Figure 2:
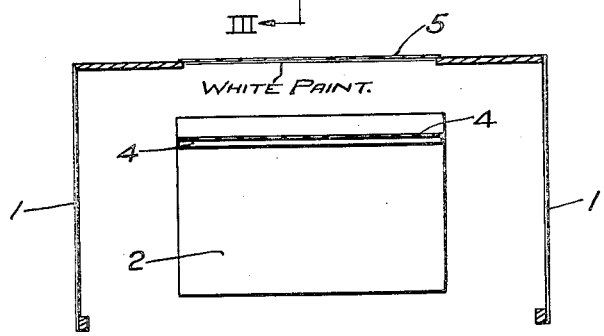
Figure 3:
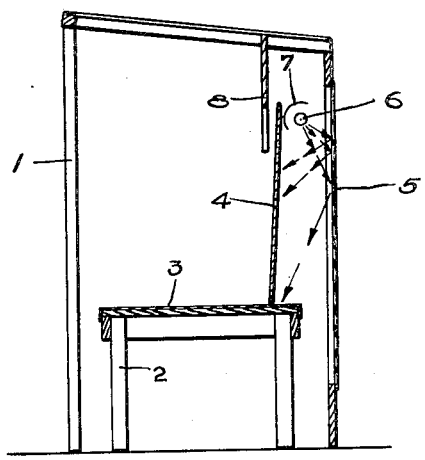

The invention relates to apparatus for inspecting flat glass, such as plate or window glass, particularly for determining the presence and location of stain, which often develops while glass is in storage. It has for its principal objects the provision of an improved apparatus which will give a very evenly diffused light as a background and one of the proper intensity and character for detecting stain, or for the ready observance of other defects. Heretofore blue sky and daylight were the best known aids to stain examination, and the present apparatus serves to provide a more positive means of examination and one which is not subject to variation due to light and weather conditions. One embodiment of the invention is illustrated in the accompanying drawing, wherein:

Figure 1 is a front elevation of the apparatus. And Figs. 2 and 3 are sections on the lines II—II and III—III respectively of Fig. 1.

Referring to the drawing, 1 is a suitable booth in which the apparatus is enclosed, such booth being open on its front side. Seated in the central part of the booth is a table 2 which acts as a support for the glass sheets to be examined, such table having its top covered with a sheet of black felt 3. Seated on the table in upright position is a plate of light diffusing glass 4 preferably a sheet of ordinary plate glass having its front face roughened by grinding or etching and its rear face polished. Back of the glass plate 4 is a plate 5 having its surface painted a flat white. A mercury vapor lamp 6 extends along the upper edge of the plate 5, and the light from this lamp is reflected downward and to the rear onto the plate 5 by the reflector 7. In front of the glass plate 4 is a light baffle 8 shaped as indicated in Fig. 1 and serving to cut off any light which would otherwise be reflected over the top of the glass plate and the reflector and into the eyes of the inspector. The wall surrounding the plate 5 and the rest of the inner surface of the booth are preferably painted black so that the only brightly illuminated surface is that of the glass plate 4.

In operation the glass plate which is to be inspected for stain is placed on the table 2 and observed in this position and tilted at various angles as conditions may require. The glass plate 4 provides a white uniformly illuminated background whose reflection on the surface of the plate gives a very clear showing of any stain which may be present. The glass plates being inspected may also be observed for other defects by raising them so that they are approximately parallel with the plate 4. The major portion of the light rays providing the illumination of the plate 4 are supplied by reflection from the plate 5 against which the light from the lamp 6 is directed by the reflector 7. This insures a high degree of uniformity in the illumination of the plate but without undue brightness or glare, which conditions relieve the eyes of the inspector from strain and cause any stain present to be easily detected by an experienced operator.

What I claim is:

1. In combination in glass inspection apparatus, an upright plate of glass having one surface roughened so as to diffuse the light passing therethrough, an upright flat light colored surface back of the plate adjacent thereto, a source of illumination extending along the upper portion of the plate intermediate the plate and said light colored surface, a reflector between the source of illumination and the plate arranged to reflect the light downward over the light colored surface, and a dark colored supporting surface extending forward from the lower edge of the plate.

2. In combination in glass inspection apparatus, an upright plate of glass having one surface roughened so as to diffuse the light passing therethrough, an upright flat light colored surface back of the plate adjacent thereto, a lamp extending along the upper portion of the plate intermediate such plate and said light colored surface, a reflector extending partially around the lamp and arranged to reflect the light therefrom downwardly and to the rear, and a flat black supporting member extending forward beneath the plate.

D. H. BOGGS.
W. J. HEFNER.